(12) United States Patent
Tsouris et al.

(10) Patent No.: US 6,179,987 B1
(45) Date of Patent: Jan. 30, 2001

(54) METHOD AND APPARATUS TO ELECTROLYTICALLY PRODUCE HIGH-PURITY MAGNETITE PARTICLES

(75) Inventors: Constantinos Tsouris, Oak Ridge; David W. DePaoli, Knoxville; Joel T. Shor, Oak Ridge, all of TN (US)

(73) Assignee: UT Battelle, LLC, Oak Ridge, TN (US)

( * ) Notice: Under 35 U.S.C. 154(b), the term of this patent shall be extended for 0 days.

(21) Appl. No.: 09/371,636

(22) Filed: Aug. 11, 1999

(51) Int. Cl.$^7$ .......................................................... C25B 1/00
(52) U.S. Cl. .......................... 205/543; 205/761; 205/548; 204/554
(58) Field of Search .................................. 205/540, 541, 205/542, 543, 545, 538, 539, 325, 324, 333, 548, 761; 204/554

(56) References Cited

U.S. PATENT DOCUMENTS

| | | |
|---|---|---|
| 3,718,594 | 2/1973 | Miller ................................. 252/62.1 |
| 3,843,773 | 10/1974 | Pingaud ................................. 423/634 |
| 3,869,359 * | 3/1975 | Beer ........................................ 204/96 |
| 3,912,646 | 10/1975 | Leitner et al. ...................... 252/62.56 |
| 4,108,787 | 8/1978 | Masaki et al. ..................... 252/62.56 |
| 4,255,492 | 3/1981 | Audran et al. ....................... 428/694 |
| 4,376,714 | 3/1983 | Pingaud ............................ 252/62.56 |
| 4,670,114 * | 6/1987 | Beer ........................................ 204/96 |
| 5,314,750 | 5/1994 | Takedoi et al. ....................... 428/402 |
| 5,658,450 | 8/1997 | Tamarkin ............................ 205/745 |

* cited by examiner

Primary Examiner—Kathryn Gorgos
Assistant Examiner—Christopher M Keehan
(74) Attorney, Agent, or Firm—Williams, Morgan & Amerson

(57) ABSTRACT

A method and apparatus to electrolytically produce high-purity magnetite particles is provided. The apparatus comprises a container for holding an electrolytic solution. In accordance with one embodiment, the electrolytic solution includes sodium chloride and deionized water. A pair of carbon steel electrodes are submerged within the electrolytic solution. A d.c. power supply is also provided to apply a voltage to the electrodes for a period of time sufficient to produce the magnetite particles.

13 Claims, 4 Drawing Sheets

METHOD AND APPARATUS TO ELECTROLYTICALLY PRODUCE HIGH-PURITY MAGNETITE PARTICLES

BACKGROUND OF THE INVENTION

1. Field of the Invention

The present invention relates generally to the production of metal oxides, and, more particularly, to a method and apparatus for producing magnetite particles by an electrocoagulation process.

2. Description of the Related Art

Magnetite ($Fe_3O_4$), an iron oxide, has natural magnetic properties that provide a multitude of uses in industry. For example, magnetite is widely used in the manufacturing of recording materials, printing, xerographic imaging, wastewater treatment, among having various other uses.

The quality of magnetite used has been particularly important to the magnetic recording industry. With the demand for smaller and lighter-weight magnetic recording devices, there has been an increasing need for recording mediums, such as magnetic recording tape and magnetic disks, for example, to have a higher recording density, sensitivity, and output characteristics. In order to meet these demands, the magnetite particles produced would desirably have a smaller particle size with a higher coercive force.

Magnetite has been shown to form as an intermediate during the oxidation of iron. Initially, a layer of ferric oxide is formed, the underlying layer of iron then reacts with the ferric oxide to reduce it and form zones of magnetite and ferrous oxide. Currently, chemical processes are employed to produce magnetite. In accordance with one of these processes, magnetite is produced by a high temperature hydrogen reduction of ferric oxide precipitated from a solution, which forms magnetic particles by electrodeposition. In this process, iron and other ions are present in the solution, and the metal is deposited using a pulsating electric field. The deposited metal is then sloughed off using a pulsating sonic field. In accordance with another chemical process, the production of ferromagnetic materials by electrochemical galvanic coagulation in an aqueous medium is performed. This chemical process is fully described in U.S. Pat. No. 5,658,450.

Although these chemical processes are known to produce magnetite, such processes typically produce relatively large-sized particles having a low coercive force. In addition, the aforementioned chemical processes also tend to produce the magnetite with a relatively high impurity content. Accordingly, the optimal characteristics of magnetic recording materials are not fully realized as a result of these undesirable characteristics encountered by these current practices.

SUMMARY OF THE INVENTION

The present invention is directed to overcoming, or at least reducing the effects of, one or more of the problems set forth above by providing a method and apparatus for obtaining nano-sized metal oxide particles.

Accordingly, the present invention provides for the production of metal oxide particles, and is particularly advantageous in producing magnetite particles. The present invention includes a method for submerging a pair of metal electrodes in an electrolytic solution, and applying a voltage to the pair of electrodes for a period of time sufficient to produce the metal oxide particles.

In one aspect of the present invention, an apparatus is provided for producing a metal oxide, such as magnetite particles. The apparatus comprises a container adapted to hold an electrolytic solution, and a pair of metal electrodes submerged in the electrolytic solution of the container. A power supply is further provided to apply a voltage to the pair of electrodes for a period of time sufficient to produce the metal oxide particles. The metal electrodes used to produce magnetite are preferably constructed of iron in the form of carbon steel plates. The electrodes may be constructed of other types of transitional metals including, but not necessarily limited to, cobalt, nickel, cadmium, zinc, manganese, or magnesium. The electrolytic solution typically includes aqueous sodium chloride to provide sufficient conductivity between the electrodes.

BRIEF DESCRIPTION OF THE DRAWINGS

The invention may be best understood by reference to the following description taken in conjunction with the accompanying drawings.

While the invention is susceptible to various modifications and alternative forms, specific embodiments thereof have been shown by way of example in the drawings and are described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention involves the production of metal oxides, such as magnetite ($Fe_3O_4$), for example, by an electrocoagulation process. The process includes submerging a pair of metal electrodes in a temperature-controlled electrolytic solution, and applying a voltage to the electrodes. Nano-sized metal oxide particles are produced by electrolysis of the metal electrodes. The invention for producing these metal oxides will be fully appreciated with reference to the following example.

EXAMPLE

Figure 1:
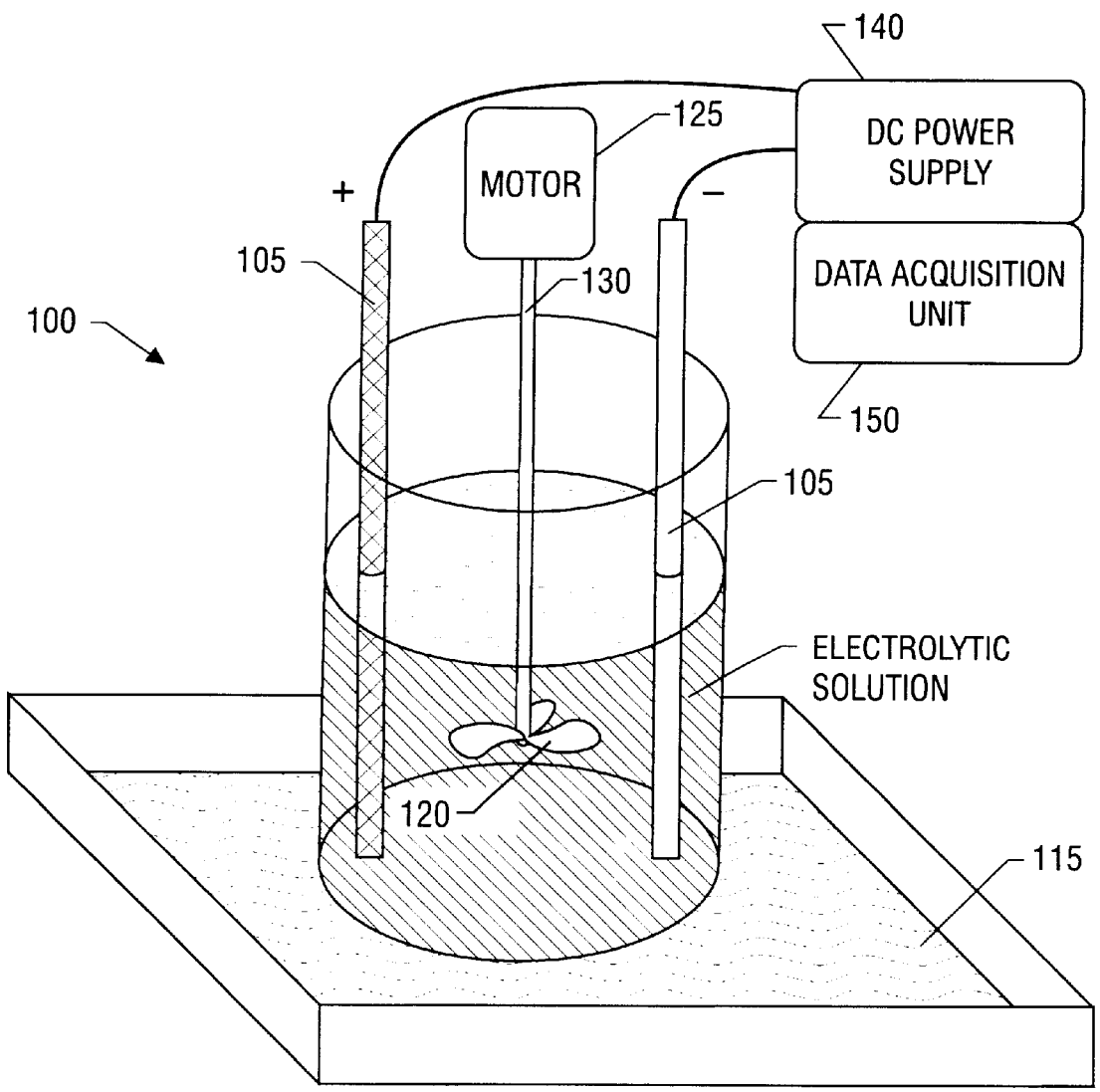
FIG. 1 is a schematic diagram of an apparatus for producing a metal oxide, such as magnetite, for example, according to one embodiment of the present invention.

Turning now to the drawings, and specifically referring to FIG. 1, an electrolytic cell 100 for producing a metal oxide by an electrocoagulation process is provided. The electrolytic cell 100 comprises a container 110 that includes two metal electrodes 105 disposed therein. In accordance with one embodiment, the container 110 is glass. It will be appreciated, however, that the container 110 may be constructed of various other materials including, but not necessarily limited to, metal, teflon, lexan, and plexiglass, for example.

In accordance with this particular example, magnetite (i.e., black iron oxide, $Fe_3O_4$) is produced within the cell 100, and the electrodes 105 are carbon steel plates that measure approximately 7.6 cm long, 4.8 cm wide, and 1.0 mm in thickness. The electrodes 105 were separated within the glass container 110 by a distance of approximately 5.0 cm. It will be appreciated to those of ordinary skill in the art, however, that other configurations of electrode geometry, size, and/or spacing may be made without departing from the spirit and scope of the present invention. Furthermore, it will be appreciated that the present invention need not necessarily be limited to the production of magnetite, but may also involve the synthesis of other metal oxides, with the application of other transition metals such as cobalt, nickel, cadmium, zinc, manganese, or magnesium, for example. Accordingly, the electrodes 105 need not necessarily be limited to iron (and more specifically carbon steel plates) as shown in this example, but could also be constructed of other metals that are capable of yielding other types of metal oxide solids when subjected to the electrocoagulation process described below.

The glass container 110 was filled with approximately 200 ml of an electrolytic solution to completely submerge the electrodes 105. The electrolytic solution includes deionized water and sodium chloride (NaCl), where the ionic content of the solution was approximately 0.04 molar NaCl to facilitate conductivity between the electrodes 105.

The electrolytic cell 100 was disposed within a water bath 115 to control the temperature of the electrolytic solution within the glass container 110. The temperature of the sodium chloride solution was adjusted within the temperature range of 30° and 90° C. It will be appreciated that the temperature of the sodium chloride solution need not necessarily be limited to this specific temperature range in order to produce magnetite; however, it was found that the 30–90° C. temperature range was optimal for producing magnetite in the sodium chloride solution.

The sodium chloride solution was continually stirred by a stirrer 120, which is driven by a motor 125 via a shaft 130. The stirrer 120 was a glass impeller; however, it will be appreciated that the stirrer 120 may include other types of stirring tools, and, thus, need not necessarily be limited to the glass impeller. Alternatively, the stirrer 120, along with the accompanying motor 125 and shaft 130, may be omitted such that the sodium chloride solution is not stirred. Although stirring the solution facilitates the formation of magnetite particles, it was found that the particles will form without the solution being stirred.

The electrodes 105 were coupled to a direct current (DC) power supply 140 with a predetermined voltage applied thereto. The power supply 140 is a Hewlett Packard—HP 6654A direct current power supply, and in one embodiment, the predetermined voltage applied to the electrodes 105 was between 5 and 30 volts. It will be appreciated, however, that the voltage applied to the electrodes could fall outside of the range between 5 and 30 volts, if so desired. A data acquisition unit 150 was also coupled to the electrodes 105 to monitor the electrical current through the electrodes 105.

Batch experiments were conducted using the apparatus of FIG. 1 to determine the effect of various process conditions on the production of magnetite solids using the sodium chloride solution. As an alternative to utilizing a batch system for producing magnetite, a flow system could be used in lieu thereof to perform the electrocoagulation process.

Before each batch experiment was conducted, the glass container 110 was filled with a sodium chloride solution to a point that fully submerged the electrodes 105, which was approximately 200 ml of solution. The desired temperature of the solution was then obtained by adjusting the temperature of the water bath 115. As previously mentioned, experiments were conducted with the temperature of the sodium chloride solution falling within the 30–90° C. temperature range. Typically, experiments in this example were conducted with the solution having a temperature of 30°, 60°, or 90° C.

The electrodes 105 were inserted into the sodium chloride solution and coupled to the power supply 140. For experiments in which the solution was stirred, the stirrer 120 was immersed into the solution, and the motor 125 was turned on to activate the stirrer 120. The data acquisition unit 150 was then used to measure the electrical current through the electrodes 105 for a 60 second period. During this 60 second period, no voltage was applied to the electrodes 105. Upon expiration of the 60 second period, the power supply 140 was turned on to apply a d.c. voltage to the electrodes 105 for a period of time sufficient to produce the magnetite solids in the sodium chloride solution. In this example, the period of time that was sufficient to produce magnetite was 940 seconds; however, such period of time may be more or less than 940 seconds depending on a number of factors, such as the temperature of the sodium chloride solution, for example.

The results of the electrocoagulation experiments using sodium chloride solution, are shown in Table 1 below. The table specifies the operating conditions such as voltage, current, temperature, and product formation results from seven separate batch experiments that were conducted.

TABLE 1

Results of Electrocoagulation Experiments for Magnetite Formation*

| Experiment | Voltage (V) | Temperature (° C.) | Current (A) | Final Fe Conc. (total) (ppm) | Volume Magnetic Susceptability (for vol. Of 200 µl) |
|---|---|---|---|---|---|
| 1 | 5 | 30 | 0.08 | 99.33 | 3.00E−6 |
| 2 | 2.5 | 30 | 0.02 | 39.58 | N/A |
| 3 | 7.5 | 30 | 0.13 | 166.73 | 6.00E−6 |
| 4 | 5 | 60 | 0.12 | 163.20 | 6.00E−6 |
| 5 | 5 | 90 | 0.17 | 219.91 | 7.00E−6 |
| 6 | 5 | 30 | 0.14 | 168.71 | 7.00E−6 |
| 7 | 5 | 30 | 0.54 | 709.77 | 5.60E−6 |

*Solutions were prepared by adding NaCl (0.1% by weight) to deionized water.

The magnetite solids produced were analyzed by methods including magnetic-susceptibility measurements, electron microscopy, and X-ray diffraction.

Magnetic susceptibility, which also determines the feasibility of solid-liquid separation by magnetic filtration, was measured using a model MSB_AUTO magnetic susceptibility balance manufactured by Johnson Matthey Fabricated Equipment of Wayne, Pa. After each experiment, a representative sample of the suspension was used for the magnetic susceptibility measurements. From each sample, the suspension volumes of 200 and 300 μl were used for triplicate measurements.

The size and the morphology of the solids produced by the experiments were investigated by analyzing several samples using scanning electron microscopy (SEM). A JOEL JSM-T220A scanning electron microscope was used to take these measurements. Samples of solids were prepared by centrifuging the suspension, removing the supernatant, re-suspending the particles in ethanol, placing a sample of the suspension on a carbon planchet glued to a brass stub, and allowing the sample to dry to a thin, uniform film. Subsequent to being dried at room temperature, the samples were coated with gold (200 Å) with an argon sputterer (Hummer 6.2, Anatech Ltd., Springfield, Va.). SEM pictures were taken at 20 kV at various magnifications.

X-ray diffraction was also performed on a selected number of samples to confirm the production of magnetite solids. A sintag PAD X theta-theta diffractometer was employed for these investigations. This unit was outfitted with a constant-potential X-ray generator operating at 45 kV/40 mA with a copper target. The spectrum scanning rate was set at two theta-per-minute. Data acquisition and analysis were performed using Sintag's DMSNT (Data Management Systems) software.

Figure 2A:
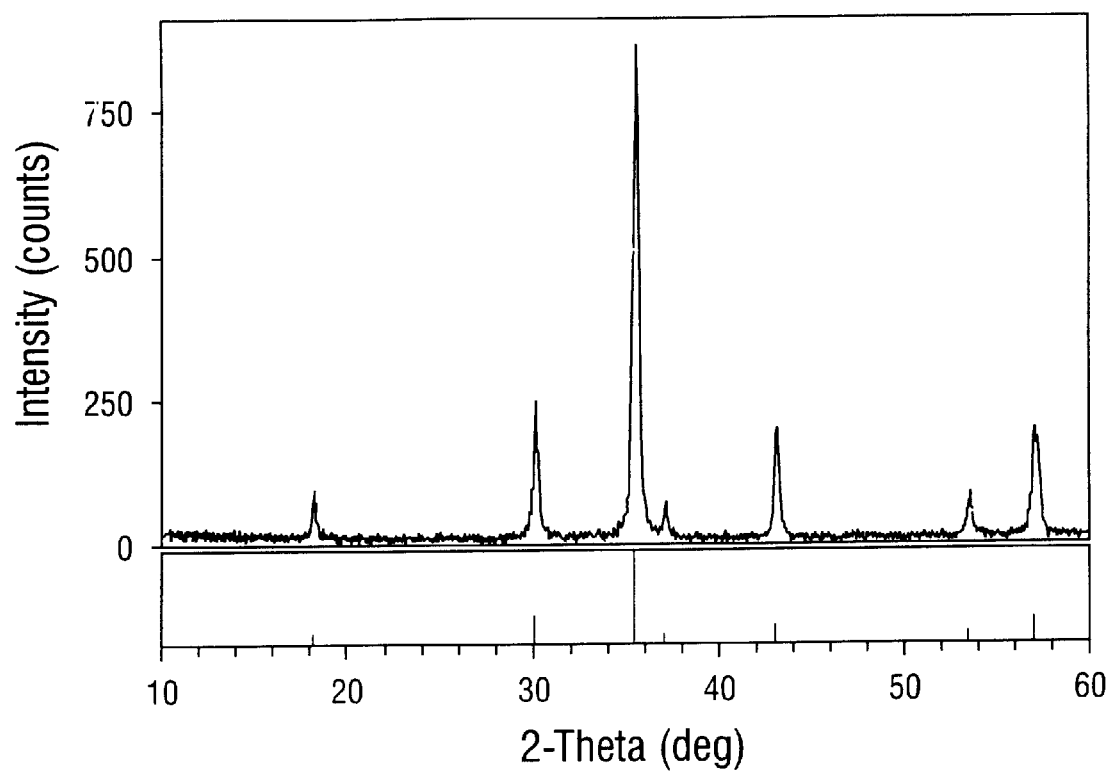
FIG. 2A is an X-ray diffraction of magnetite formed by the process described in the example provided.
Figure 2B:
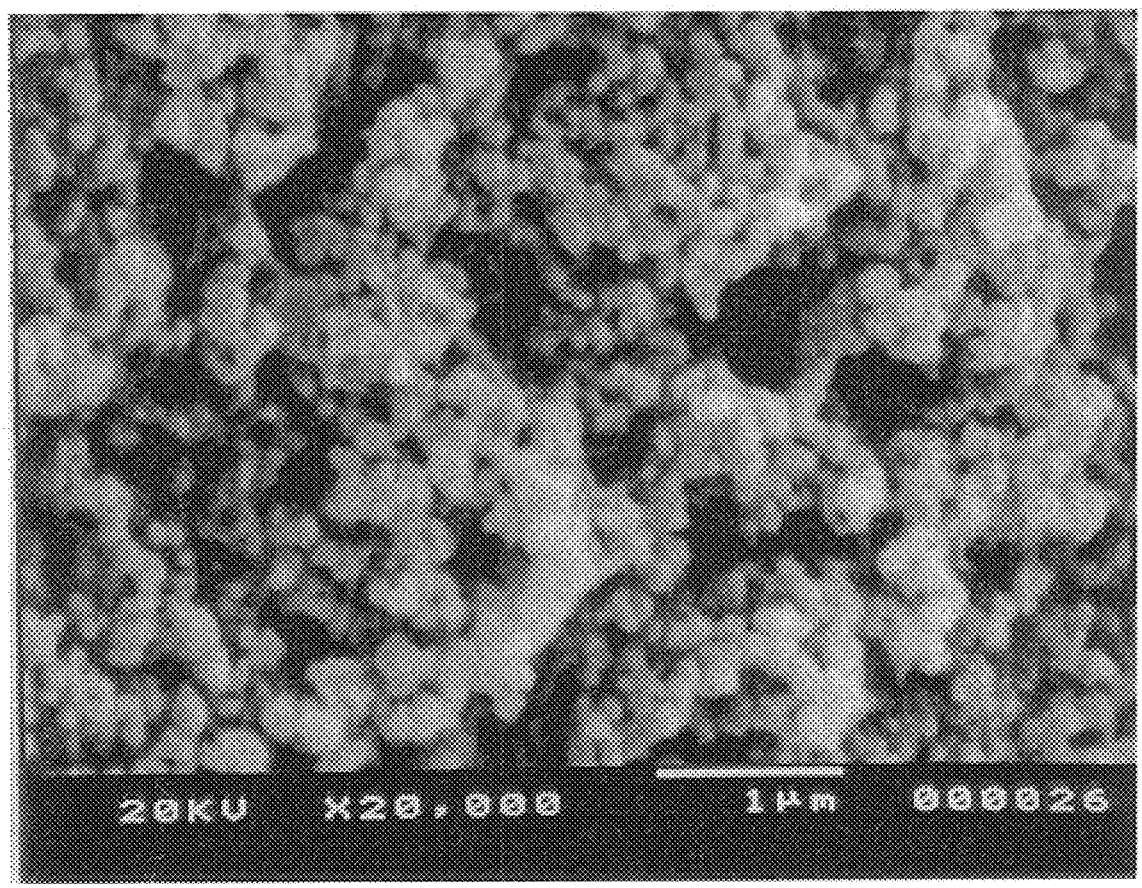
FIG. 2B is an SEM micrograph of magnetite formed when sodium chloride is the electrolyte.

Through the experiments, it was found that pure magnetite particles (i.e., black iron oxide $Fe_3O_4$) were formed at temperatures between 30° and 90° C. when the sodium chloride/deionized water solution was used as the medium between the two electrodes 105. The production of magnetite from the sodium chloride solution was confirmed by X-ray diffraction, as illustrated in FIG. 2A (which was obtained using the results from experiment 7 of Table 1 above). The peaks in FIG. 2A correspond to the formation of magnetite solids only. The size and morphology of these magnetite solids from experiment 7 are shown in FIG. 2B, which was obtained by SEM analysis. The magnetite solids that were formed had a spherical shape with a diameter of approximately 100 nm.

Figure 3A:
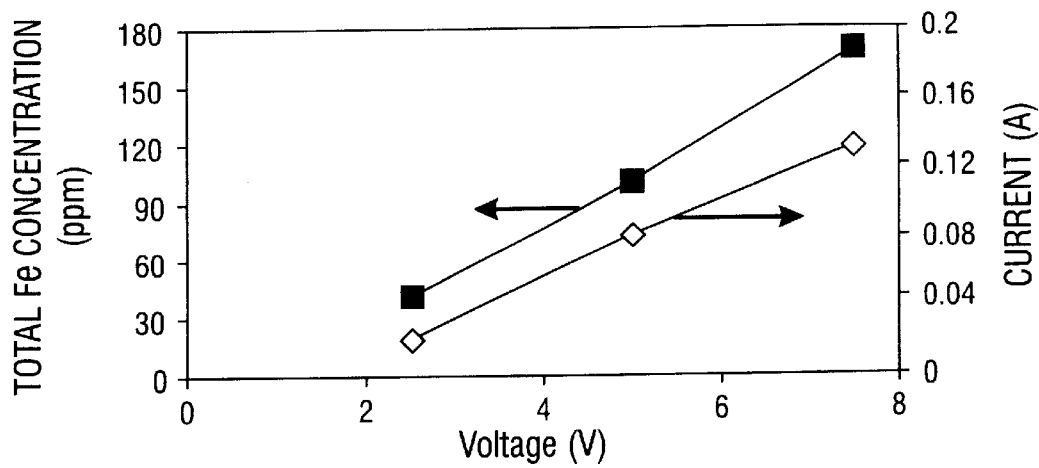
FIGS. 3A–C show the effect of applied voltage, temperature, and average current on the total iron concentration for various experiments in an aqueous NaCl solution.
Figure 3B:
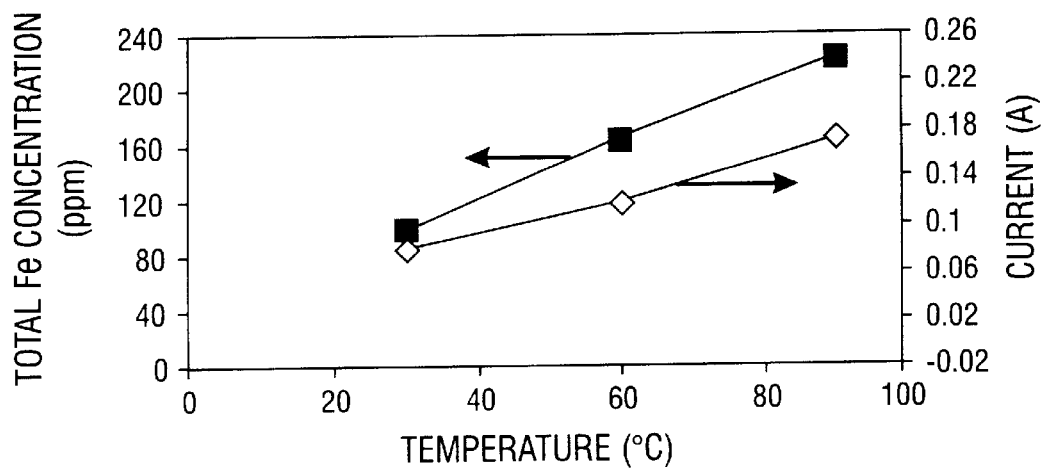
Figure 3C:
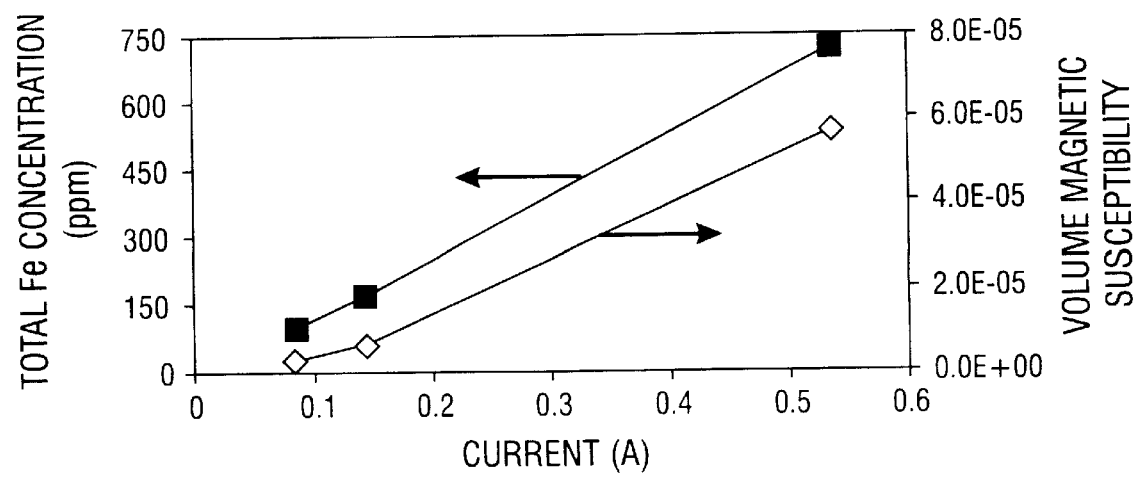

FIGS. 3A–C illustrate the effects of the various operating conditions such as applied voltage, temperature, etc. of the magnetite particles that were formed in the sodium chloride solution. Referring to FIG. 3A, the effect of applied voltage on the total iron concentration of the magnetite particles formed is shown by comparing the results of experiments 1–3 of Table 1. As the voltage applied to the electrodes 105 increases, the electrical current through the electrodes 105 increases, and, as a result, the total iron concentration of the magnetite particles also increases. FIG. 3B shows the effect of the temperature of the sodium chloride solution on the total iron concentration by comparing the results of experiments 1, 4, and 5 of Table 1. As the temperature of the sodium chloride solution increases, the electrical current through the electrodes 105 increases, and the total iron concentration of the formed magnetite particles increases.

Referring to FIG. 3C, the effect of the average current through the electrodes 105 on the total iron concentration and volume magnetic susceptibility is shown. FIG. 3C shows the results of experiments 1, 6, and 7, which indicate that the total iron concentration is increased with the current remaining at a constant voltage. This demonstrates that the total iron concentration is increased either with the solution conductivity or the separation distance between the electrodes 105.

Additionally, it was observed in all seven experiments that the pH of the sodium chloride solution increased from an initial value of 6–7 to a pH of 10–12 immediately after the experiments.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

List of References

Y. Terashima, H. Ozaki and M. Sekine, Water Res., 20 (1986) 537

V. M. Makarov, E. A. Indeikin, A. P. Yusova, I. V. Savitskaya, V. F Babanin, S. V. Vasil'ev and L. G. Derboneva, Khim. Technol. Vody, 6 (1984) 35.

U. B. Ogutveren and S. Koparal, J. Envirornm. Sci. and Health, A32 (1997) 2507.

C. T. Tsai, Water Res., 31 (1997) 3072.

E. A. Vik, D. A. Carlson, A. S. Eikum and E. T. Gjessing, Water Res., 18 (1984) 1355.

M. J. Matteson, R. L. Dobson, R. K. Glenn, Jr., N. S. Kukunoor, W. H. Waits III and E. J. Clayfield, Colloids Surfaces, 104 (1995) 101.

D. R. Jenke and F. E. Diebold, Water Res., 18 (1984) 855.

T. E. Boyd, M. Y. Price and R. L. Kochen, Report RFP-3601, Rockwell International, Rocky Flats Plant, Golden, Colo., 1985.

S. A. Slater, D. B. Chamberlain, S. A. Aase and C. B. Babcock, Sep. Sci. Technol., 32 (1997) 127.

R. L. Kochen, Report RFP-4100, Rockwell International, Rocky Flats Plant, Golden, Colo., 1987.

H. G. Heitmann, in Y. A. Yiu (Ed.), Industrial Applications of Magnetic Separations, Institute of Electrical and Electronics Engineering, Inc., New York, 1979, p. 115.

A. M. H. Shaik and S. G. Dixit, Water Res., 26 (1992) 845.

Y. Wang and E. Forsberg, Minerals and Metallurgical Processing, 1994, p. 87.

G. Bitton, J. L. Fox and H. G. Strikland, Appl. Microbiol., 30 (1975) 905.

R. Dauer and E. H. Dunlop, Biotechnol. Bioeng., 37 (1991) 021.

G. Bitton and R. Mitchell, Water Res., 8 (1974) 549.

C. Tsouris and T. C. Scott, J. Colloid Interface Sci., 171 (1995) 319.

C. Tsouris, S. Yiacoumi and T. C. Scott, Chem. Eng. Commun., 137 (1995) 147.

T. Y. Ying, S. Yiacoumi and C. Tsouris, High-Gradient Magnetically Seeded Filtration, Chem. Eng. Sci., submitted.

What is claimed:

1. An electrocoagulation method for producing substantially pure magnetite particulates; comprising:

immersing iron containing electrodes in an electrolytic solution comprising sodium chloride;

maintaining solution temperature between 30° and 90° C.;

applying a voltage between said electrodes for a time sufficient to produce magnetite particulates free of other iron oxide compounds.

2. The method of claim 1 wherein the magnetite particulates are approximately 100 nm.

3. The method of claim 1 further comprising increasing the temperature to cause an increase in total current through the electrodes.

4. The method of claim 1 wherein the sodium chloride is approximately 0.1% by weight.

5. The method of claim 1 further comprising stirring the solution.

6. The method of claim 1 wherein the voltage is between about 2 and about 30 volts.

7. The method of claim 1 wherein the voltage is about 5 volts.

8. The method of claim 1 wherein the voltage is about 2.5 volts.

9. The method of claim 1 wherein the voltage is about 7.5 volts.

10. The method of claim 1 wherein the time sufficient to produce the magnetite particulates is about 15 minutes.

11. The method of claim 1 wherein about 710 ppm of magnetite is produced at 5 volts and temperature of about 30° C. at a current of about 0.54 amperes.

12. The method of claim 1 further comprising depositing the nanoparticulate magnetite particulates onto a substrate surface.

13. The method of claim 1 wherein the iron electrodes are identified as carbon steel electrodes.

* * * * *

UNITED STATES PATENT AND TRADEMARK OFFICE
CERTIFICATE OF CORRECTION

PATENT NO. : 6,179,987 B1
DATED : January 30, 2001
INVENTOR(S) : Constantinos Tsouris, David W. DePaoli and Joel T. Shor It is certified that error appears in the above-identified patent and that said Letters Patent is hereby corrected as shown below:

Column 1,
Before "BACKGROUND OF THE INVENTION" insert the following paragraph:

-- The U.S. Government has a paid-up license in this invention and the right in limited circumstances to require the patent owner to license others on reasonable terms as provided for by the terms of Grant No. S-90,074 awarded by the Department of Energy. --

Signed and Sealed this

Fourteenth Day of August, 2001

Attest:

NICHOLAS P. GODICI
Attesting Officer  Acting Director of the United States Patent and Trademark Office